(12) United States Patent
Thompson et al.

(10) Patent No.: US 12,539,376 B2
(45) Date of Patent: Feb. 3, 2026

(54) INHALER

(71) Applicant: 1000739373 ONTARIO LTD., Sudbury (CA)

(72) Inventors: Mitch Thompson, Sudbury (CA); Patrick Lehoux, Sudbury (CA); Dominic Coballe, Ottawa (CA); Jason Rainville, Chelmsford (CA); Dave Rodney, Copper Cliff (CA)

(73) Assignee: 1000739373 Ontario Ltd., Sudbury (CA)

( * ) Notice: Subject to any disclaimer, the term of this patent is extended or adjusted under 35 U.S.C. 154(b) by 979 days.

(21) Appl. No.: 17/766,036

(22) PCT Filed: Oct. 2, 2020

(86) PCT No.: PCT/CA2020/051331
§ 371 (c)(1),
(2) Date: Apr. 1, 2022

(87) PCT Pub. No.: WO2021/062560
PCT Pub. Date: Apr. 8, 2021

(65) Prior Publication Data
US 2022/0347405 A1   Nov. 3, 2022

Related U.S. Application Data

(60) Provisional application No. 62/909,996, filed on Oct. 3, 2019.

(51) Int. Cl.
*A61M 15/00* (2006.01)
*A61M 11/04* (2006.01)
(Continued)

(52) U.S. Cl.
CPC .......... *A61M 15/009* (2013.01); *A61M 11/04* (2013.01); *A61M 15/0016* (2014.02);
(Continued)

(58) Field of Classification Search
CPC .......... A61M 15/0016; A61M 15/0021; A61M 15/0025–0026; A61M 15/009;
(Continued)

(56) References Cited

U.S. PATENT DOCUMENTS

| 5,918,780 A | 7/1999 | Tanaka |
| 2008/0210230 A1 | 9/2008 | Lintern et al. |

(Continued)

FOREIGN PATENT DOCUMENTS

| CA | 1164750 A | 4/1984 |
| CA | 2494016 A1 | 2/2004 |

(Continued)

OTHER PUBLICATIONS

Office Action issued on corresponding Indian Patent Application No. 202227025312, dated Sep. 23, 2022, 5 pages.

(Continued)

*Primary Examiner* — Rachel T Sippel
(74) *Attorney, Agent, or Firm* — The Webb Law Firm

(57) ABSTRACT

An inhaler including a housing having a chamber to receive a valved canister and a stem block, and a mouthpiece in fluid communication with a passage of the stem block; and an actuation mechanism including configured to engage an outer surface of the stem block at a predefined angle relative to the longitudinal axis of the stem block to cause the downward movement of the stem block to activate the valve and release the aerosolizable liquid as the dose of the aerosolized spray out of the mouthpiece of the mechanical inhaler.

26 Claims, 11 Drawing Sheets

(51) Int. Cl.
  *B65D 83/384* (2025.01)
  *B65D 83/52* (2025.01)
(52) U.S. Cl.
  CPC ....... *A61M 15/0021* (2014.02); *B65D 83/386* (2013.01); *B65D 83/52* (2013.01)
(58) Field of Classification Search
  CPC ...... A61M 11/04; A61M 11/06; A61M 11/08; B65D 83/384–386; B65D 83/52
  See application file for complete search history.

(56) References Cited

U.S. PATENT DOCUMENTS

| | | | | |
|---|---|---|---|---|
| 2011/0290268 | A1* | 12/2011 | Schennum | A61M 15/06 131/330 |
| 2014/0261474 | A1 | 9/2014 | Gonda | |

FOREIGN PATENT DOCUMENTS

| | | |
|---|---|---|
| CA | 2799993 | 12/2011 |
| CA | 2799993 A1 | 12/2011 |
| CN | 103002759 A | 3/2013 |
| JP | 2013526381 | 12/2011 |
| WO | 2006097747 A1 | 9/2006 |
| WO | 2014140724 A1 | 9/2014 |

OTHER PUBLICATIONS

Office Action issued on corresponding Chinese Patent Application No. 202080070251.0, dated Mar. 27, 2024, 30 pages.

Extended European Search report issued on corresponding European Patent Application No. EP20871141.6, dated Nov. 13, 2023, 6 pages.

Office Action issued on corresponding Japanese Patent Application No. JP2022-520265, dated Mar. 19, 2024, 13 pages.

* cited by examiner

INHALER

CROSS-REFERENCE TO RELATED APPLICATIONS

This application is the United States national phase of International Application No. PCT/CA2020/051331 filed Oct. 2, 2020, and claims priority to U.S. Provisional Patent Application No. 62/909,996 filed Oct. 3, 2019, the disclosures of which are hereby incorporated by reference in their entirety.

BACKGROUND OF THE INVENTION

Field of the Invention

This invention pertains generally to an inhaler and in particular, to manually operated metered dose inhalers.

Description of Related Art

Metered dose inhalers are used to deliver aerosolized medicine such as bronchodilators and corticosteroids to the lungs. These inhalers are commonly used during the treatment of a variety of respiratory diseases or conditions including asthma and chronic obstructive pulmonary disease. Metered dose inhalers have also been used to deliver cannabinoids including cannabidiol and tetrahydrocannabinol and include Vapen™ Clear Inhaler and CBD Luxe™ CBD:THC Inhalers.

Metered dose inhalers generally include a housing with mouthpiece and actuator, a canister that includes the medicine for delivery and a metering valve for attachment to the canister.

Typically, the metered dose inhaler is a simple plastic device that allows the user to press down on the metered-dose canister and activate the spray. These plastic devices are generally the same size, shape and material. The inhaler requires the force of the user's hand or thumb to depress the canister and activate the spray. The simple inhaler has a 45° angle at which the spray is ejected out of the opening. Weakness or stiffness in the fingers and hands, particularly in individuals with arthritis and hand size impacts the ability to use traditional metered dose inhalers.

A need continues to exist to improve the functionality of inhalers and create a better experience for patients who require the use of these inhalers every day, especially patients with weakness or stiffness in the fingers and hands or patients with small hands.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an inhaler. In accordance with an aspect of the present invention, there is provided an inhaler.

In accordance with another aspect of the invention there is provided a stem block to receive a hollow valve stem of a valve assembly fitted in a canister containing an aerosolizable liquid. The stem block comprises: a body having an upper end and a lower end, and defining an elongated passage on an inner portion thereof, the elongated passage configured to receive the hollow valve stem of the canister through a lower end of the elongated passage; the body further defining a dispensing passage on the inner portion thereof, the dispensing passage being axially aligned with the elongated passage, a lower end of the dispensing passage being connected to an upper end of the elongated passage, wherein the lower end of the dispensing passage has a width narrower than the width of the upper end of the elongated passage, thereby providing a ledge portion at the intersection of the dispensing passage and the elongated I passage, the ledge portion being configured to contact an upper end of the hollow valve stem to prevent upward axial movement of the stem valve into the dispensing passage, the elongated passage and the dispensing passage together forming an inner passage through the stem block between the lower end and the upper end; and wherein the stem block has an outer surface configured to receive an external force from a predefined angle relative to the longitudinal axis of the elongated passage to move the stem block axially downward and force the hollow valve stem into the canister.

In accordance with another aspect of the invention there is provided an apparatus for delivering a dose of an aerosolized spray. The apparatus comprises a canister fitted with a valve assembly having a hollow valve stem and containing an aerosolizable liquid; and a stem block The stem block comprises: a body having an upper end and a lower end, and defining an elongated passage on an inner portion thereof, the elongated passage configured to receive the hollow valve stem of the canister through a lower end of the elongated passage; the body further defining a dispensing passage on the inner portion thereof, the dispensing passage being axially aligned with the elongated passage, a lower end of the dispensing passage being connected to an upper end of the elongated passage, wherein the lower end of the dispensing passage has a width narrower than the width of the upper end of the elongated passage, thereby providing a ledge portion at the intersection of the dispensing passage and the elongated I passage, the ledge portion being configured to contact an upper end of the hollow valve stem to prevent upward axial movement of the stem valve into the dispensing passage, the elongated passage and the dispensing passage together forming an inner passage through the stem block between the lower end and the upper end; and wherein the stem block has an outer surface configured to receive an external force from a predefined angle relative to the longitudinal axis of the elongated passage to move the stem block axially downward and force the hollow valve stem into the canister.

In accordance with another aspect of the invention there is provided an inhaler for dispensing a dose of an aerosolizable liquid from a canister fitted with a valve assembly having a hollow valve stem and provided with a stem block defining an inner passage configured to receive the hollow valve stem of the canister. The inhaler comprises: a housing having a chamber configured to receive the canister and the stem block therein, and a mouthpiece configured to be in fluid communication with the passage of the stem block; and an actuation mechanism comprising at least one stem block engagement element configured to move between a resting position and an activated position, wherein in the activated position, the stem block engagement element is configured to engage an outer surface of the stem block at a predefined angle relative to the longitudinal axis of the stem block to cause the downward movement of the stem block to activate the valve and release the aerosolizable liquid as the dose of the aerosolized spray.

In accordance with another aspect of the invention there is provided a metered dose inhaler for dispensing medicine from a canister fitted with a metering valve, the inhaler comprising a housing with mouthpiece, and actuation mechanism, the actuation mechanism comprising at least one actuation button and a stem block, the actuation button comprising a stem block engagement element, wherein when the actuation buttons are activated, the stem block engagement elements engage the stem block thereby activating the metering valve and releasing the aerosol out of the mouthpiece of the inhaler.

In accordance with another aspect of the invention, there is provided a kit comprising an inhaler, a stem block, and/or a valved canister as described above.

BRIEF DESCRIPTION OF THE DRAWINGS

These and other features of the invention will become more apparent in the following detailed description in which reference is made to the appended drawings.

DESCRIPTION OF THE INVENTION

Figure 1:
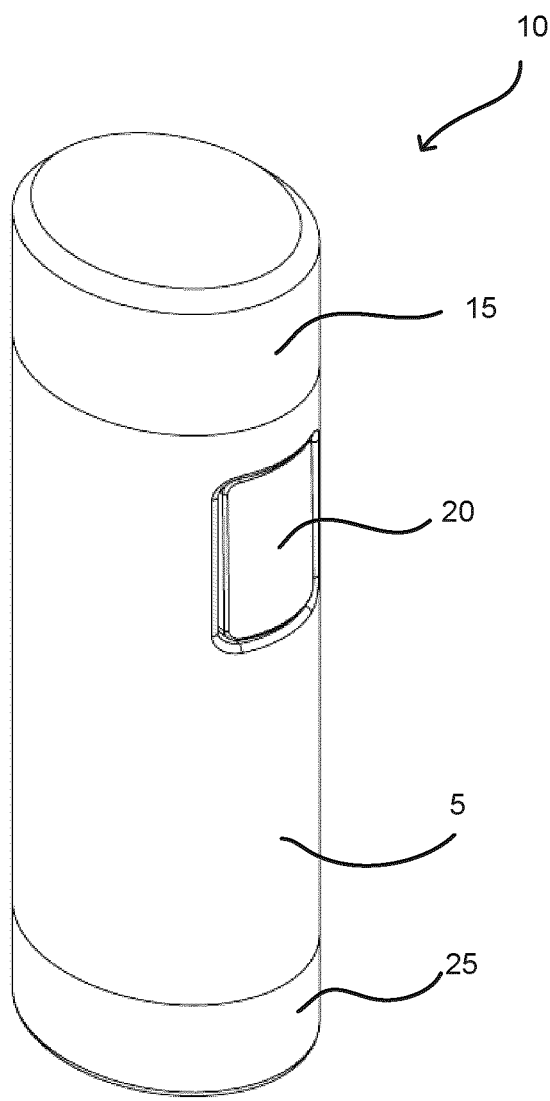
FIG. 1 illustrates a perspective view of a metered dose inhaler according to one embodiment of the invention.

The present invention provides an inhaler with improved functionality and easy usability.

In one aspect, the present invention provides a stem block for an inhaler. In some embodiments, the stem block is configured for use with a canister fitted with a valve system/assembly comprising a hollow valve stem and containing an aerosolizable liquid.

The stem block comprises a body having an upper end and a lower end, and an elongated valve stem passage defined on an inner portion of the body. The elongated passage is configured to receive the hollow valve stem of the canister through a lower end of the elongated passage. The body further defines a dispensing passage, which is fluidly connected to a dispensing passage that has a width narrower than the width of the upper end of the valve stem passage, which prevents an upward axial movement of the stem valve into the dispensing passage.

In some embodiments, the dispensing passage is axially aligned with the valve stem passage, wherein a lower end of the dispensing passage is connected to an upper end of the valve stem passage, and wherein the lower end of the dispensing passage has a width narrower than the width of the upper end of the valve stem passage to form block has a ledge portion at the intersection of the dispensing passage and the valve stem passage. The ledge portion is configured to contact an upper end of the hollow valve stem to prevent upward axial movement of the stem valve into the dispensing passage. In some embodiments, the elongated stem valve passage and/or the dispending passage are cylindrical.

The stem block has an outer surface configured to receive an external force from a predefined angle relative to the longitudinal axis of the stem block body and/or the elongated passage to move the stem block axially downward and force the hollow valve stem into the canister to activate the container valve assembly and release the aerosolizable liquid through the dispensing passage.

In some embodiments, stem block comprises a nozzle connected to an upper end of the dispensing passage, which is configured to dispense an aerosolized liquid. In some embodiments, the nozzle is connected axially to the upper end of the dispensing passage.

In some embodiments, an upper width of the dispensing passage is smaller than the lower width of the dispensing passage.

In some embodiments, the stem block is configured for placement within an inhaler housing. In some embodiments, the stem block is configured for removable placement inhaler housing. In some embodiments, the outer surface of the stem block includes indents, ridges, or textured elements to facilitate placement within an inhaler housing. In some embodiments, the stem block is provided with one or more grooves disposed around a perimeter thereof to facilitate the axial movement of the stem block in the housing.

In some embodiments, the canister is fitted with a metering valve.

The stem block can have various footprints including a circular, oval or square. In some embodiments, the footprint is a rounded-off square. In some embodiments, the stem block is configured to facilitate self aligning.

In another aspect, the present invention provides an apparatus for delivering a dose of an aerosolized spray. The apparatus comprises a canister fitted with a valve assembly having a hollow valve stem and containing an aerosolizable liquid; and a stem block as described herein, coupled in fluid communication with the hollow valve stem.

In some embodiments, the apparatus is configured for placement within an inhaler housing. In some embodiments, apparatus is configured for removable placement within an inhaler housing. In some embodiments, the outer surface of the stem block includes indents, ridges, or textured elements to facilitate placement within an inhaler housing. In some embodiments, the stem block is provided with a plurality of grooves or indentations disposed around a perimeter thereof to facilitate the axial movement of the stem block in the housing.

In some embodiments, the apparatus further comprises a housing having a chamber configured to receive the canister and the stem block therein. The housing is provided with a mouthpiece in fluid communication with dispensing passage of the stem block. The housing further comprises an actuation mechanism configured to engage the outer surface of the stem block at the predefined angle relative to the longitudinal axis of the stem block to cause the downwards movement of the stem block to activate the valve and release the aerosolizable liquid as the aerosolized spray through the mouthpiece of the housing.

In some embodiments, the actuation mechanism comprises at least one stem block engagement element, wherein upon actuation the stem block engagement element, wherein upon actuation the stem block engagement element engages the outer surface of the stem block at the predefined angle to cause the downwards movement of the stem block to activate the valve and release the aerosolizable liquid as the aerosolized spray through the mouthpiece of the housing.

In some embodiments, the actuation mechanism comprises an actuation button associated/connected with the stem block engagement element. The actuation button when pressed, causes the stem block engagement element to contact the outer surface of the stem block to cause the downwards movement of the stem block to actuate the valve and release the dose of the aerosolizable liquid.

In some embodiments, the actuation mechanism comprises two stem block engagement elements disposed on opposite sides of the housing, wherein upon actuation both stem block engagement elements contact the outer surface of the stem block to cause the downwards movement of the stem block. In some embodiments, the actuation mechanism comprises two actuation buttons each connected with a respective stem block engagement element, wherein pressing one or both of the actuation buttons causes the downwards movement of the stem block.

In some embodiments, the housing chamber is configured to removably receive the canister and the stem block therein.

In some embodiments, the housing chamber includes internal elements to facilitate placement of the canister, placement of the stem block, or the placement of both the canister and the stem block.

In some embodiments, the internal elements include one or more track elements or grooves to receive the stem block. In some embodiments, the internal elements include one or more track elements or grooves to interact with the corresponding grooves and track elements provided on the outer surface of the stem block. In some embodiments, the internal elements include one or more runners or ridges corresponding to one or more grooves or indentations provided on the outer surface of the stem block.

In another aspect, the present invention provides an inhaler for dispensing a dose of an aerosolizable liquid from a canister fitted with a valve assembly having a hollow valve stem coupled with a stem block, wherein the stem block defines an inner passage configured to receive the hollow valve stem of the canister. The inhaler comprises a housing having a chamber configured to receive the canister and the stem block therein, and a mouthpiece configured to be in fluid communication with the inner passage of the stem block.

The actuation mechanism comprises at least one stem block engagement element configured to move between a resting position and an activated position. In the activated position, the stem block engagement element is configured to engage an outer surface of the stem block at a predefined angle relative to the longitudinal axis of the stem block to cause a downward movement of the stem block to activate the valve and release the aerosolizable liquid as the aerosolized spray through the mouthpiece of the inhaler.

In some embodiments, the actuation mechanism comprises an actuation button associated with stem block engagement element, wherein pressing the button causes the stem block engagement element to engage the outer surface of the stem block to cause the downward movement of the stem block to activate the metering valve and release the dose of the aerosolizable liquid.

In some embodiments, the actuation mechanism comprises a resilience member coupled to the housing to bias the stem block engagement element in the rest position. In some embodiments, at one end the resilience or spring member is contiguous with or connected to the stem block engagement element, and the second end of the resilience or spring member is attached either to the housing, or a band or a holder configured to positioned within the housing.

In some embodiments, the resilience member is an elongated flexible plastic member contiguous with the stem block engagement member.

In some embodiments, the inner passage of the stem block includes a valve stem passage portion sized to receive the valve stem. The valve stem passage portion is fluidly connected to a narrower dispensing passage portion. In some embodiments, the stem block comprises a ledge defined at the intersection of valve stem passage and the dispensing passage. The ledge is configured to contact an upper end of the hollow valve stem to prevent upward axial movement of the stem valve into the dispensing passage.

In some embodiments, the stem block has a nozzle in fluid connection with the dispensing passage.

In some embodiments, the stem block, the valve stem and the mouthpiece in a substantially straight configuration.

In some embodiments, the mouthpiece is detachable. In some embodiments, the inhaler housing has open lower end having a detachable end cap. Accordingly, in some embodiments, the housing, mouthpiece and bottom end cap include compatible threaded connections. In other embodiments, the housing, mouthpiece and bottom end cap are snapped together.

Some embodiments include a mouthpiece cover that can be screwed or snaps into place. In some embodiments, the mouthpiece cover includes an internal thread and the mouthpiece includes a compatible threaded element.

In some embodiments, the inhaler further comprises a stem block removably positioned in the chamber.

In some embodiments, the inhaler comprises a canister fitted with a valve assembly and a stem block positioned in the chamber.

In some embodiments, the valve is a metering valve and the inhaler is a metered dose inhaler.

The housing can have any cross-section appropriate for the canister. In some embodiments, the housing has a circular, oval, square or rounded square cross section.

The mouthpiece opening can be a variety of sizes and shapes including round or oval.

In some embodiments, the mouthpiece and/or the housing optionally include a seal.

In some embodiments, the hollow housing includes openings for the actuation buttons. The openings for the actuation buttons are generally in diametrically opposite locations or on opposite sides of the housing. The size and configuration of the openings is generally dependent on size and configuration of the buttons. Optionally, when installed the button surfaces are flush with the surface of the housing.

In some embodiments, the openings in the housing and the actuation buttons are replaced with pre-formed actuation buttons that are part of the housing. The perimeter or edges of each of the buttons being configured to be resiliently flexible so that after the buttons are pressed and released, they return to their starting position.

In other embodiments, the resilience or spring member is a living hinge.

Each button in the pair of actuation buttons may be identical or specifically configured for the digit that will be used to press the button. For example, a button that will be pressed by the thumb may be larger than one by a single finger. Alternatively, one button may be configured for the thumb and the second button configured for two adjacent fingers. The surface of the buttons is optionally textured.

Each actuation button includes a button face that is contact surface for the user's digit, a stem block engagement element and a resilience or spring member. The actuation button may be of unitary construction or formed from two or more components, for example, the stem block engagement element and resilience or spring member may be a single piece thereby providing for the use of a different material for the button face.

In some embodiments, the inhaler is provided fully assembled including stem block and canister. Alternatively, the inhaler is provided with stem block but without the valved canister, or without metered canister and stem block.

The canister can be made from a metal such as aluminum. The canister contains a pressurized aerosolizable liquid comparing a medicine or a composition.

In some embodiments, the medicine in the canister is a bronchodilators or corticosteroids.

In some embodiments, the medicine in the canister is cannabidiol, tetrahydrocannabiol or combination thereof.

In another aspect the present invention provides a kit comprising an inhaler, a removable stem block, and/or a valve canister, all as described herein.

In some embodiments, the kit comprises an inhaler with a removable stem block positioned within the housing, and a valved canister.

In some embodiments, the kit comprises an inhaler and a removable stem block coupled with a valved canister.

In some embodiments, the valved canister and the canister and stem block are provided as a kit. In this case, a new stem block is used with each new canister reducing the chance of malfunction, blocking, or sticking of the stem block. Optionally, kits including the components of the inhaler may be provided.

To gain a better understanding of the invention described herein, the following examples are set forth with reference to the accompanying drawings, which are not drawn to scale, and the illustrated components are not necessarily drawn proportionately to one another. It will be understood that these examples are intended to describe illustrative embodiments of the invention and are not intended to limit the scope of the invention in any way.

EXAMPLES

FIGS. 1 to 7 illustrate an exemplary metered dose inhaler 10 for dispensing an aerosolizable liquid from a canister 45 as an aerosolized spray.

Figure 2:
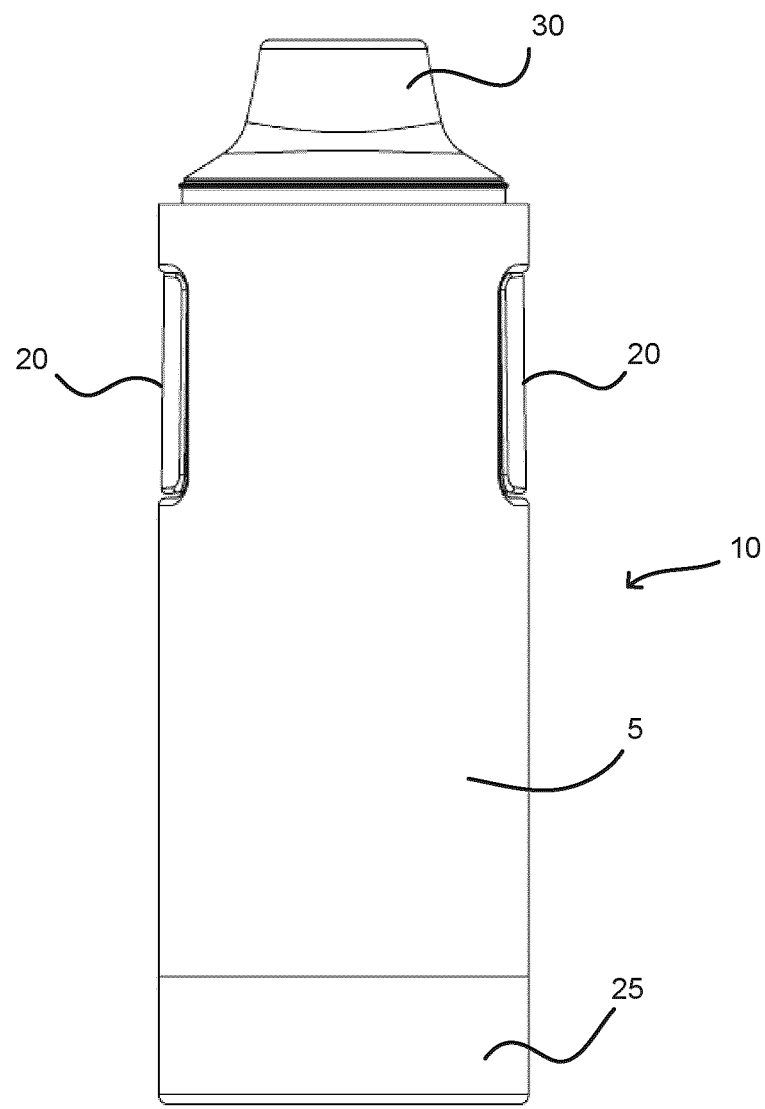
FIG. 2 illustrates a front view of the metered dose inhaler of FIG. 1.
Figure 3:
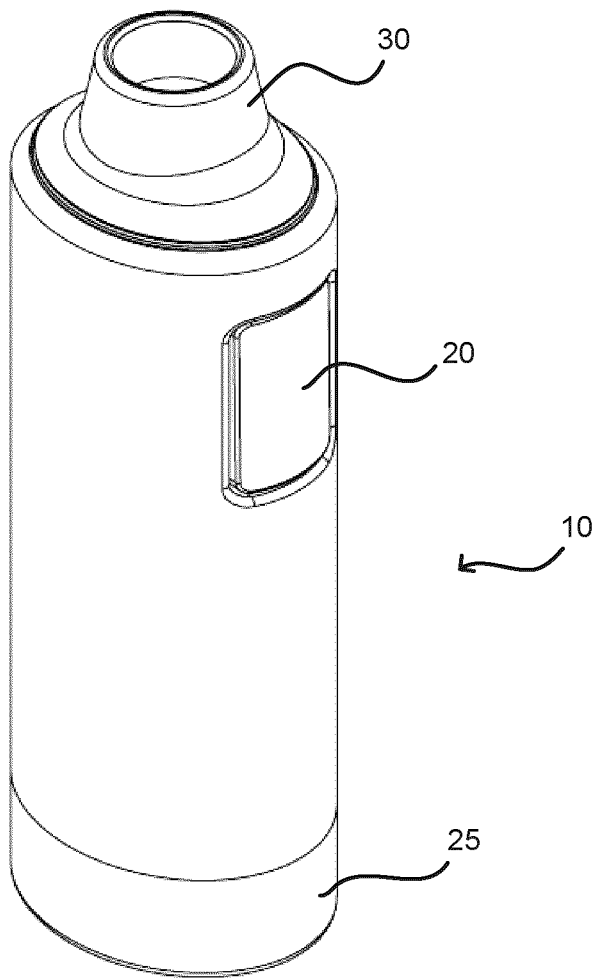
FIG. 3 illustrates a perspective view of the metered dose inhaler of FIG. 1.
Figure 4:
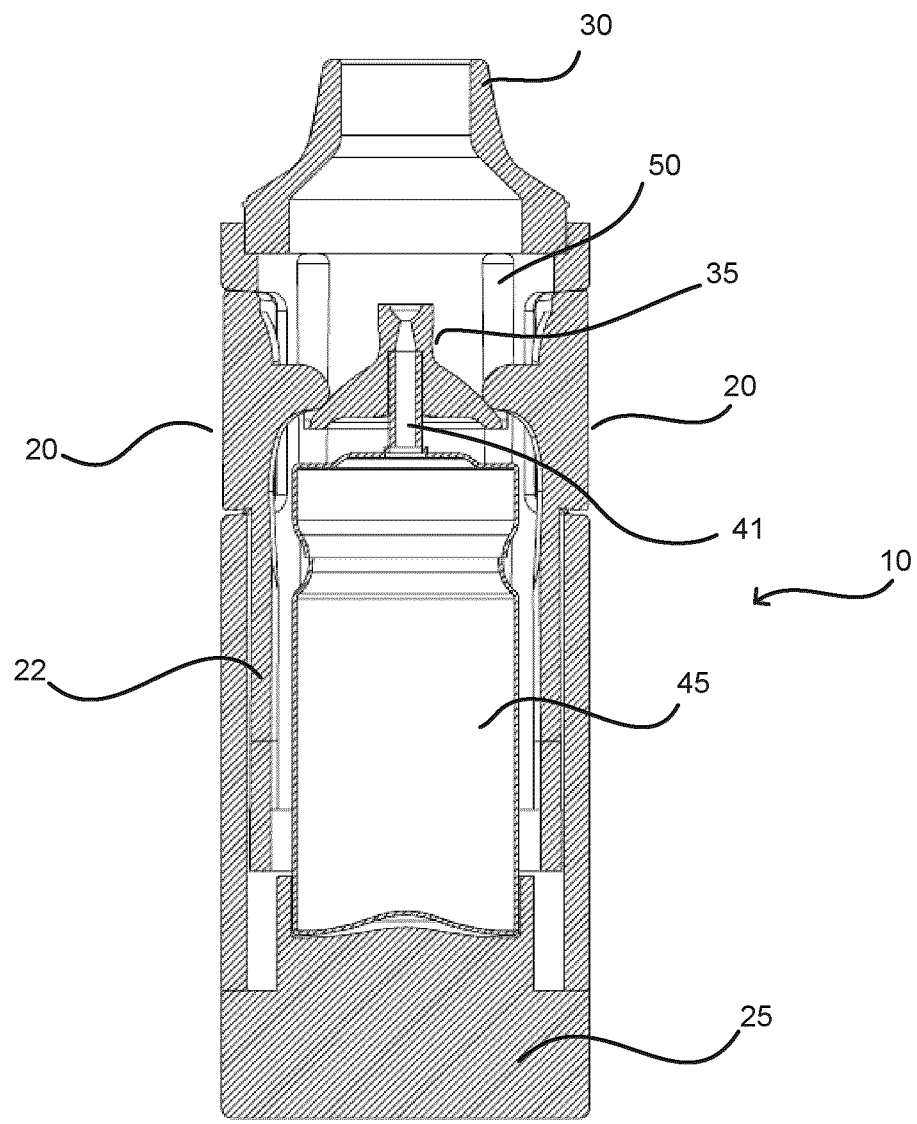
FIG. 4 shows a vertical cross section of the dose inhaler of FIG. 1.
Figure 5:
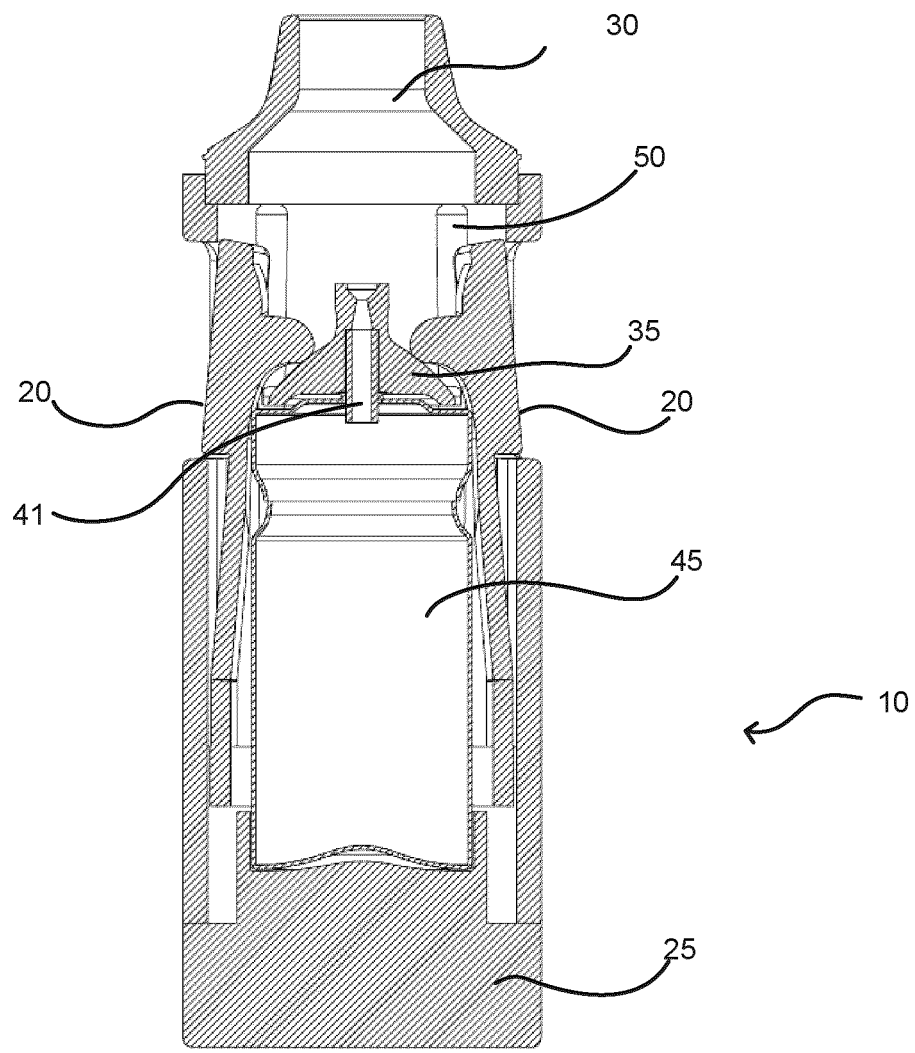
FIG. 5 shows the inhaler of FIG. 4 in an activated position.
Figure 6:
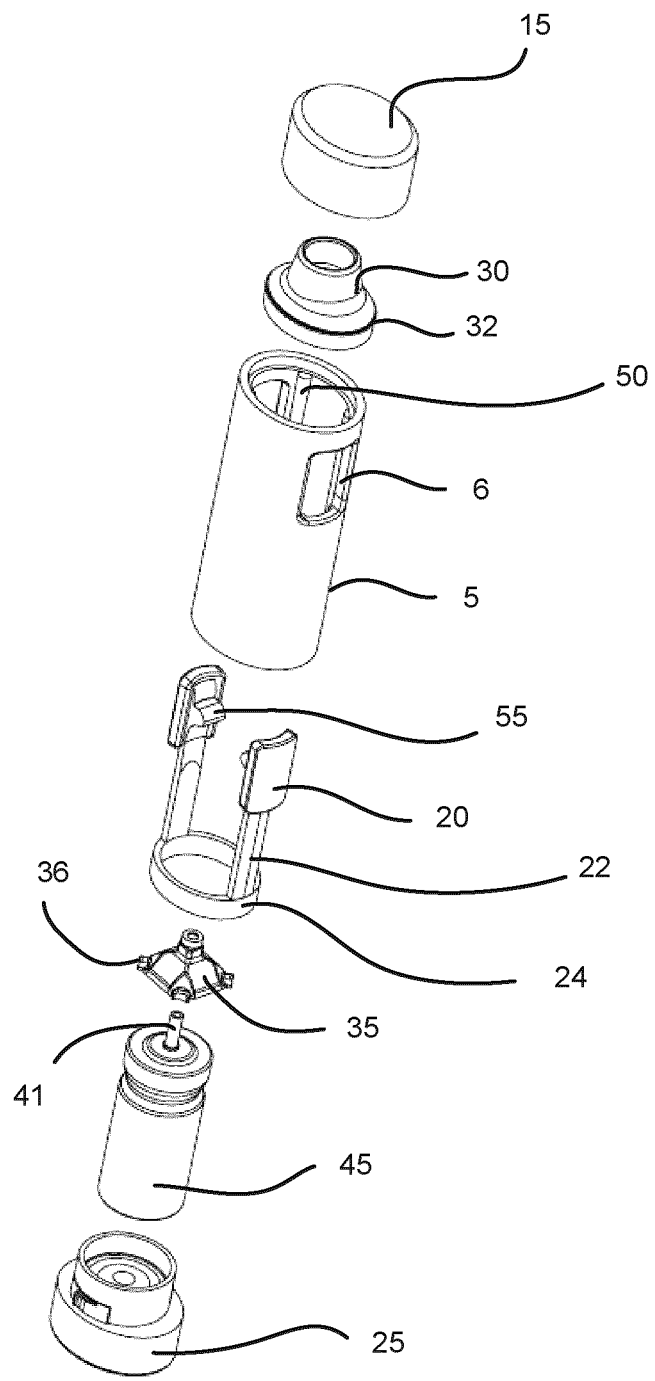
FIG. 6 shows an exploded view of the inhaler of FIG. 1.
Figure 7:
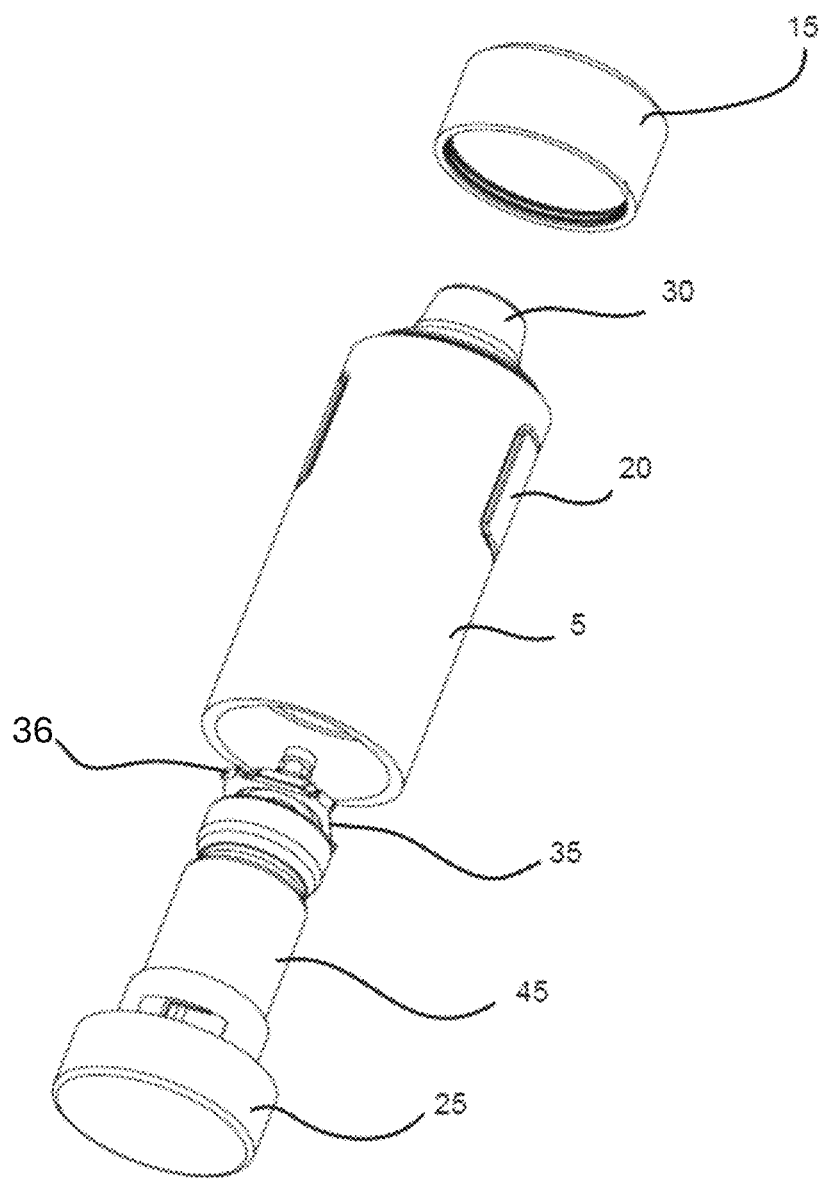
FIG. 7 shows a partial exploded view of the inhaler of FIG. 1.

Referring to FIGS. 1 to 7, the metered dose inhaler comprises an open-ended hollow housing 5 with detachable mouthpiece 30, which can be covered with mouth piece cover 15 and bottom end cap 25. The mouthpiece 30 and bottom end cap 25 are threadably connected or snapped to the housing 5. FIGS. 2 and 3 illustrate, a front view and a perspective view, respectively, of the metered dose inhaler 10 of FIG. 1 with mouthpiece cover removed to show the mouthpiece 30. As shown in FIGS. 6 and 7, the mouthpiece 30 can include a seal 32.

The hollow housing 5 is configured to receive the metered-dose canister 45. The inhaler 10 further includes two actuation buttons 20 operably connected to stem block engagement elements 55 to depress a stem block 35. The stem block 35 sits on the metered-dose canister 45 fitted with a metering valve assembly. When the actuation buttons 20 are activated or pressed laterally or perpendicular to the axis of the metered dose inhaler 10, the stem block 35 activates the metering valve assembly and releases the aerosolized spray out of the mouthpiece 30 of the inhaler 10.

Referring to FIGS. 4 and 5, canister 45 includes a metering valve assembly, which includes a hollow dispensing member/valve stem 41 which is mounted for sliding movement relative to the canister between an extended position, to which the valve stem is biased by a biasing mechanism (not shown) in the valve assembly, and a depressed position. Movement of the valve stem 41 from the extended position to the depressed position results in a dose of the aerosolized medicine or composition being dispensed from the canister 45.

The stem block 35 is configured to engage both the stem block engagement element of the actuation buttons 20 and metered dose valve 41 of the canister.

In the extended position of the valve stem 41, the pressurised formulation in the canister 45 is placed in fluid communication with the metering chamber through the valve stem 41 so that the metering chamber is filled with pressurised formulation. When the valve stem 41 is depressed, the pressurised formulation in the metering chamber is isolated from the canister 45 and placed in fluid communication with the external environment through the mouthpiece 30 via the stem block 35. Thus, the volume of pressurised formulation in the metering chamber (which includes a metered amount of the medicine or composition) is discharged to the external environment via the valve stem 41, then the stem block 35 and ultimately the mouthpiece 30.

Referring to FIGS. 6 and 7, the actuation mechanism includes two actuation buttons 20 each having a button face that is contact surface for the user's digit, a stem block engagement element shown as protrusions 55, and an elongated resilience or spring member 22, which can be flexible plastic member. The actuation button 20 can be of unitary construction or formed from two or more components, for example, the stem block engagement element and resilience or spring member can be a single piece thereby providing for the use of a different material for the button face. In some embodiments, the stem block engagement element is an engagement protrusion 55.

Figure 8:
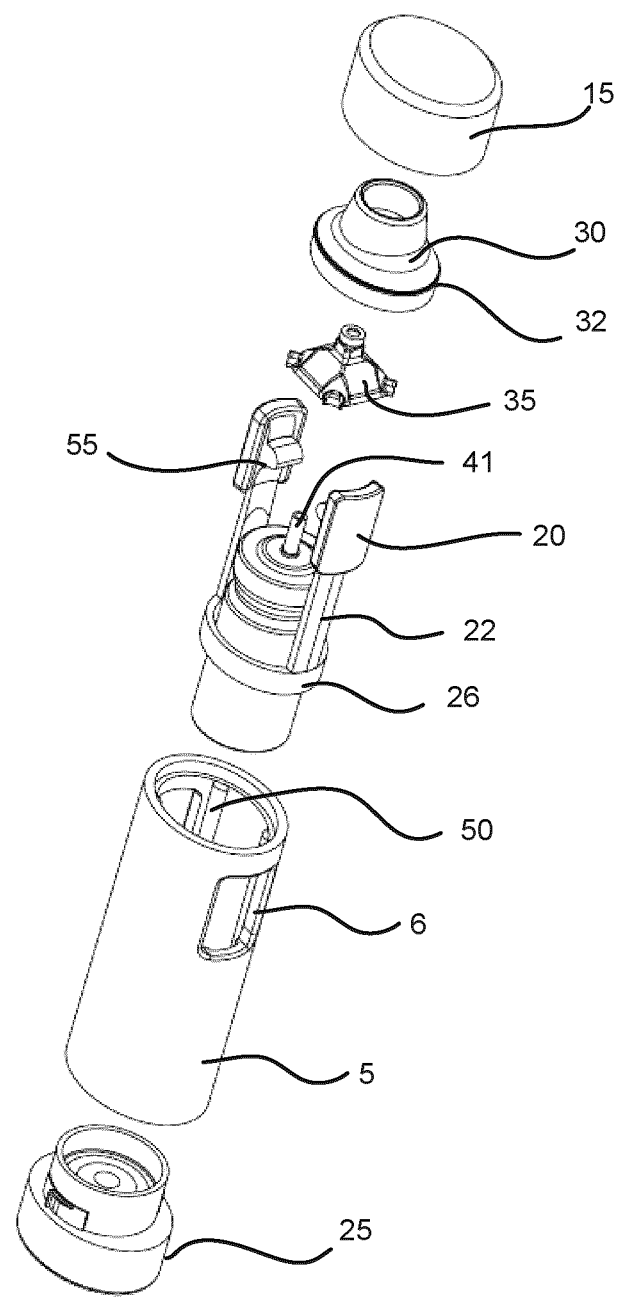
FIG. 8 shows an exploded view of an alternative inhaler.

The resilience or spring member 20 is operatively attached to the actuation button 20 and the engagement protrusion 55 to return the button and the engagement protrusion 55 to their resting positions after release. At one end the resilience or spring member is contiguous with or connected to the stem block engagement element. The second end of the resilience or spring member is attached either to a band 24 as illustrated in FIG. 6 or a holder 26 for the canister as illustrated in FIG. 8.

Referring to FIGS. 4 and 5, the engagement protrusions 55, are shaped so that when the button is pressed, the engagement protrusion 55 moves along the stem block at a predefined angle thereby pushing the stem block down.

Referring to FIG. 6, the hollow housing 5 includes openings 6 for the actuation buttons 20. The openings 6 for the actuation buttons are generally in diametrically opposite locations or on opposite sides of the housing 5. The size and configuration of the openings 6 is generally dependent on size and configuration of the buttons. Optionally, when installed the button 20 surfaces are flush with the surface of the housing 5.

In other examples, the openings in the housing 6 and the actuation buttons 20 can be replaced with pre-formed actuation buttons that are part of the housing 5. The perimeter or edges of each of the buttons being configured to be resiliently flexible so that after the buttons are pressed and released, they return to their starting position.

Referring to FIGS. 6 and 7, the housing 5 includes internal elements in the form of one or more tracks or runners 50 to facilitate placement of the canister 45, and/or the placement of the stem block 35.

Figure 10A:
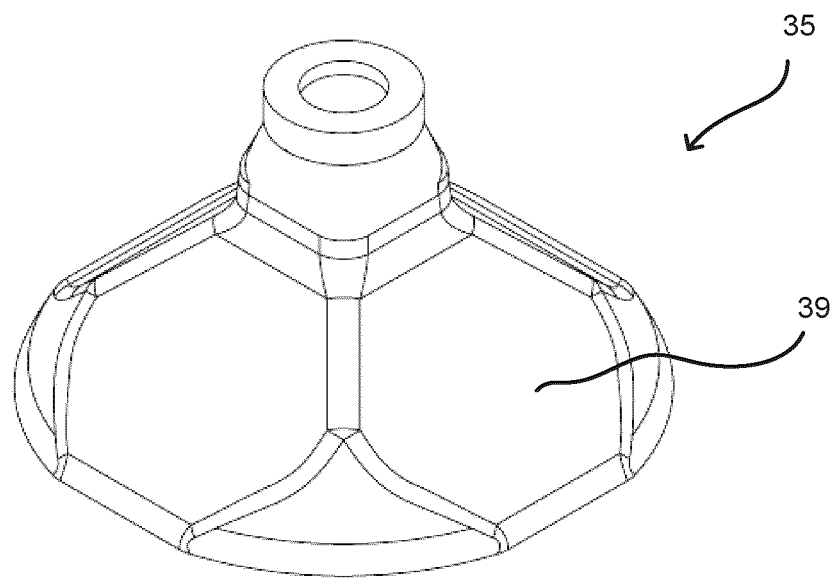
FIG. 10A shows an alternative stem block.
Figure 10B:
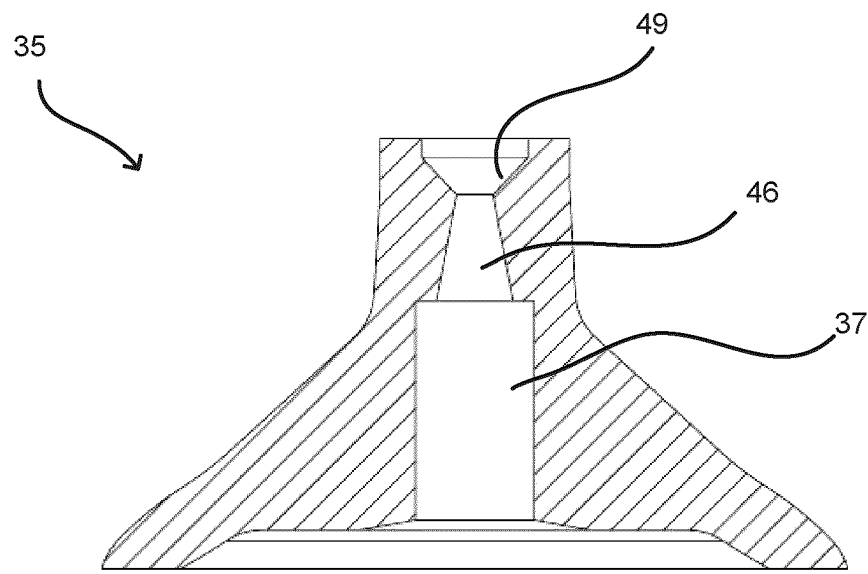
FIG. 10B shows a vertical cross section of the stem block of the present invention.

Referring to FIG. 10, the stem block 35 includes a passage 37 sized for the hollow dispensing member or valve stem 41 of a metered dose valve. The valve stem passage 37 is connected to a narrower dispensing passage 46. The lower end of dispensing passage 46 has a width that is narrower than the upper end of valve stem passage 37 to form a ledge at the intersection of the valve stem passage 37 and dispensing passage 46 to prevent upward axial movement of the stem valve into the dispensing passage. In this example, the dispensing passage 46 narrows before expanding into a nozzle 49.

The linear internal design and configuration of the stem block 35 coupled in linear fluid communication with the valve stem 41 permits the pressurised formulation from the canister 45 to exit from the mouthpiece 30 of the inhaler 10 in a linear direction along the axis of the inhaler 10.

Figure 9:
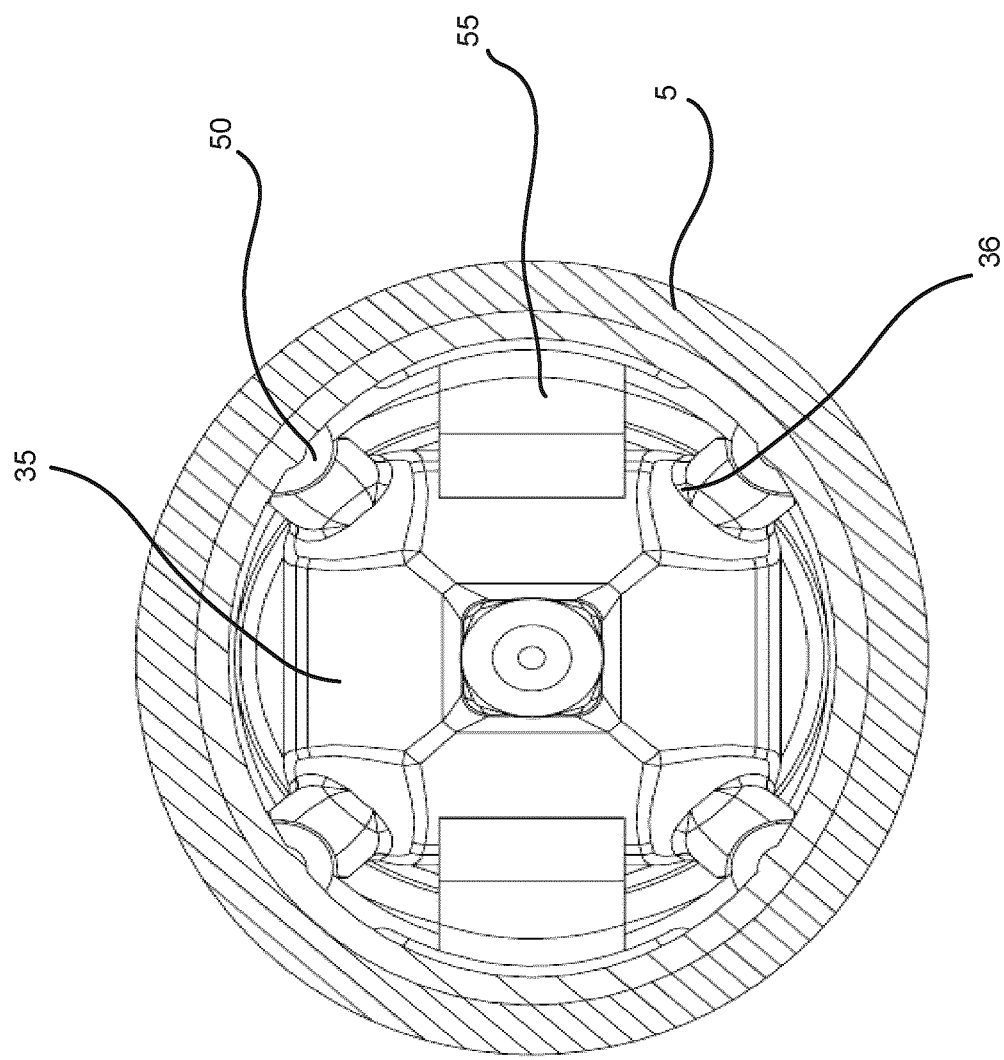
FIG. 9 shows a horizontal cross section of the inhaler.

Referring to FIGS. 6 and 9, the stem block 35 includes one or more indentations/grooves 36 configured to matingly engage track elements 50 on the inside of the housing 5.

Referring to FIG. 6, the mouthpiece 30 is connected to the housing 5 and the actuation buttons and associated mechanism are placed inside the housing 5. The stem block is installed on the metered canister and together they are installed within the housing and locked in place with the bottom end cap 25.

In another example illustrated in FIG. 8, the canister 45 is installed into a holder 26 which is then installed into the housing.

During use when pressing the buttons 20 simultaneously, engagement protrusions 55 will move along the top surfaces 39 of stem block 35 at a predetermined angle to cause valve stem 41 to travel from the extended position to the depressed position along the cylindrical axis of the inhaler 10 which activates the metered-dose canister valve. After one activated spray has been performed, the valve spring will return the stem block 35 to the extended position. The buttons 20 return to their original predetermined position once the pressure is removed from the buttons 20. Further the housing 5 has a bottom end cap 25 to enclose the canister inside the housing.

Figure 11:
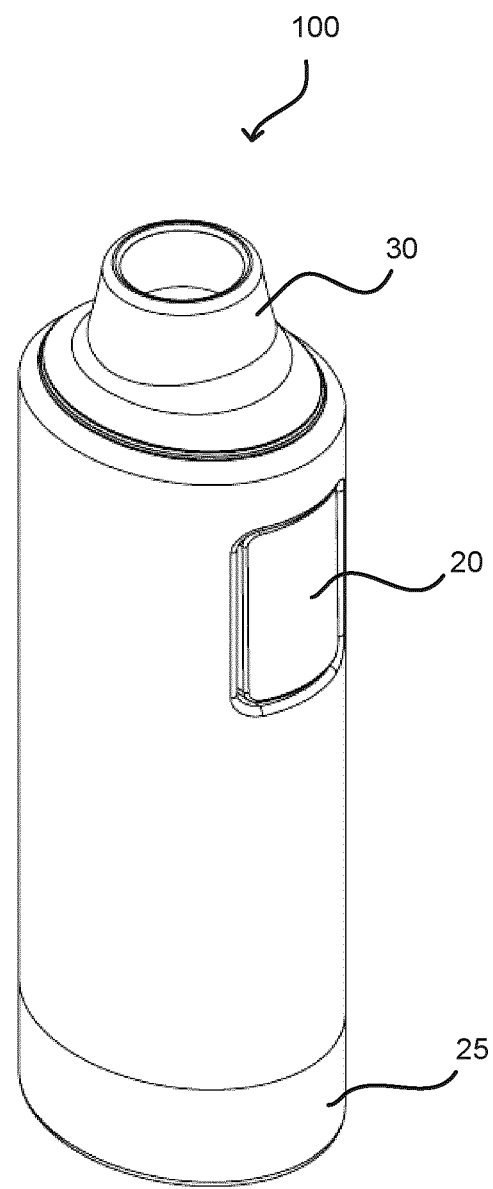
FIG. 11 illustrates a perspective view of a metered dose inhaler according to another embodiment.

FIG. 11 shows an example of an alternative metered dose inhaler 100. The metered dose inhaler 100 includes a single actuation button 20 rather than two actuation buttons in the metered dose inhaler 10 depicted in FIGS. 1 to 9. The single actuation button 20 is designed to operably depress the stem block.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A stem block to receive a hollow valve stem of a valve assembly fitted in a canister containing an aerosolizable liquid, the stem block comprising:
   a body having an upper end and a lower end, the body defining an elongated passage on an inner portion of the body, the elongated passage configured to receive the hollow valve stem of the canister through a lower end of the elongated passage;
   the body further defining a dispensing passage on the inner portion of the body, the dispensing passage being axially aligned with the elongated passage, a lower end of the dispensing passage being connected to an upper end of the elongated passage,
   wherein the lower end of the dispensing passage has a width narrower than a width of the upper end of the elongated passage, thereby providing a ledge portion at an intersection of the dispensing passage and the elongated passage, the ledge portion being configured to contact an upper end of the hollow valve stem to prevent upward axial movement of the stem valve into the dispensing passage, the elongated passage and the dispensing passage together forming an inner passage through the stem block between the lower end of the body and the upper end of the body; and
   wherein the upper end of the body is narrower than the lower end of the body, the stem block has an outer surface extending between a peripheral portion of the lower end of the body and a peripheral portion of the upper end of the body, the outer surface having at least one planar surface forming an acute angle with respect to an axis of the stem block, the acute angle being of a size such that application of an external lateral force on the at least one planar surface causes a downward axial movement of the stem block to force the hollow valve stem into the canister.

2. The stem block of claim 1, further comprising a nozzle connected to an upper end of the dispensing passage, the nozzle being configured to dispense an aerosolized liquid.

3. The stem block of claim 1, wherein an upper width of the dispensing passage is smaller than a lower width of the dispensing passage.

4. The stem block of claim 1, further configured for removable placement within a housing.

5. The stem block of claim 4, comprising a plurality of grooves or runners disposed around a perimeter of the stem block to facilitate the axial movement of the stem block in the housing.

6. The stem block of claim 1, wherein the valve assembly comprises a metering valve.

7. The stem block of claim 1, wherein the at least one planar surface comprises has two opposing planar surfaces having the acute angle relative to the longitudinal axis of the elongated passage to receive the external force to move the stem block axially downward and force the hollow valve stem into the canister.

8. An apparatus for delivering a dose of an aerosolized spray, the apparatus comprising:
   a canister fitted with a valve assembly having a hollow valve stem and containing an aerosolizable liquid; and
   the stem block as defined in claim 1, in fluid communication with the hollow valve stem.

9. An apparatus for delivering a dose of an aerosolized spray, the apparatus comprising:
   a) a canister fitted with a valve assembly having a hollow valve stem and containing an aerosolizable liquid;
   b) a stem block in fluid communication with the hollow valve stem, the stem block comprising:
   a body having an upper end and a lower end, the body defining an elongated passage on an inner portion of the body, the elongated passage configured to receive the hollow valve stem of the canister through a lower end of the elongated passage;
   the body further defining a dispensing passage on the inner portion of the body, the dispensing passage being axially aligned with the elongated passage, a lower end of the dispensing passage being connected to an upper end of the elongated passage,
   wherein the lower end of the dispensing passage has a width narrower than a width of the upper end of the elongated passage, thereby providing a ledge portion at an intersection of the dispensing passage and the elongated passage, the ledge portion being configured to contact an upper end of the hollow valve stem to prevent upward axial movement of the stem valve into the dispensing passage, the elongated passage and the dispensing passage together forming an inner passage through the stem block between the lower end of the body and the upper end of the body, and wherein the stem block has an outer surface having a predefined angle relative to the longitudinal axis of the elongated passage, the outer surface having at least one planar region configured to receive an external force to move the stem block axially to force the hollow valve stem into the canister; and c) a housing having a chamber configured to receive the canister and the stem block therein, the housing having:

a mouthpiece in fluid communication with the dispensing passage of the stem block, and an actuation mechanism configured to engage the outer surface of the stem block, the actuation mechanism comprising two block engagement elements disposed on opposite sides of the housing and two actuation buttons, each said actuation button connected with a respective stem block engagement element, wherein application of an external lateral force on one or both of the actuation buttons causes the respective stem block engagement element to engage the outer surface of the stem block to cause the downwards movement of the stem block to activate the valve and release the dose of the aerosolizable liquid as the aerosolized spray.

10. The apparatus of claim 9, wherein the apparatus is positioned removably within the housing chamber.

11. The apparatus of claim 10, wherein the stem block comprises a plurality of grooves or runners disposed around a perimeter of the stem block to facilitate the axial movement of the stem block in the housing.

12. The apparatus of claim 9, wherein the housing chamber comprises one or more track elements or grooves to receive the stem block.

13. The apparatus of claim 9, wherein the stem block further comprises a nozzle connected to an upper end of the dispensing passage, the nozzle being configured to dispense an aerosolized liquid.

14. The apparatus of claim 9, wherein an upper width of the dispensing passage of the stem block is smaller than a lower width of the dispensing passage.

15. The apparatus of claim 9, wherein the valve assembly comprises a metering valve.

16. An inhaler for dispensing a dose of an aerosolizable liquid from a canister fitted with a valve assembly having a hollow valve, the inhaler comprising:

a stem block defining an inner passage configured to receive the hollow valve stem of the canister and having an outer surface having a predefined angle relative to the longitudinal axis of an elongated passage, the outer surface having at least one planar region;

a housing having a chamber configured to receive the canister and the stem block therein, and a mouthpiece configured to be in fluid communication with the inner passage of the stem block;

an actuation mechanism comprising at least one stem block engagement element configured to move between a resting position and an activated position, wherein in the activated position, the at least one stem block engagement element is configured to engage the planar region of the stem block to cause downward movement of the stem block to activate the valve and release the dose of the aerosolizable liquid;

wherein the actuation mechanism comprises an actuation button associated with the at least one stem block engagement element, wherein pressing the actuation button causes the at least one stem block engagement element to engage the outer surface of the stem block to cause the downward movement of the stem block to actuate the hollow valve and release the dose of the aerosolizable liquid; and wherein the actuation mechanism comprises a resilience member coupled to the housing to bias the at least one stem block engagement element in the rest position.

17. The inhaler of claim 16, wherein the resilience member is an elongated flexible plastic member contiguous with the at least one stem block engagement member.

18. The inhaler of claim 16, wherein the inner passage of the stem block includes a valve stem passage portion sized to receive the valve stem, the valve stem passage portion fluidly connected to a narrower dispensing passage portion before expanding into a nozzle in fluid connection with the narrower dispensing passage portion.

19. The inhaler of claim 18, wherein the stem block comprises a ledge defined at an intersection of valve stem passage and the dispensing passage, the ledge being configured to contact an upper end of the hollow valve stem to prevent upward axial movement of the stem valve into the dispensing passage.

20. The inhaler of claim 16, wherein the stem block, the valve stem and the mouthpiece are in a substantially straight configuration.

21. The inhaler of claim 16, further comprising a mouthpiece cover.

22. The inhaler of claim 16, further comprising the stem block removably positioned in the chamber.

23. The inhaler of claim 22, further comprising the canister fitted with the hollow valve.

24. The inhaler of claim 16, wherein the hollow valve is a metering valve and the inhaler is a metered dose inhaler.

25. The inhaler of claim 16, wherein the stem block has two opposing planar regions having the predefined angle relative to the longitudinal axis of the elongated passage to receive an external force to move the stem block axially downward and force the hollow valve stem into the canister.

26. A kit comprising the inhaler as defined in claim 16 and the canister fitted with the hollow valve.

* * * * *